United States Patent [19]

Neudecker et al.

[11] Patent Number: 5,145,166
[45] Date of Patent: Sep. 8, 1992

[54] SUPPLY MAGAZAINE FOR X-RAY SHEET FILM STACK IN LIGHT-TIGHT ENVELOPE

[75] Inventors: Karl Neudecker, Munich; Hans-Joachim Reuter, Neufahrn; Manfred Schmidt, Kirchheim; Johann Zanner, Unterhaching, all of Fed. Rep. of Germany

[73] Assignee: Agfa-Gevaert Aktiengesellschaft, Leverkusen, Fed. Rep. of Germany

[21] Appl. No.: 715,799

[22] Filed: Jun. 14, 1991

[30] Foreign Application Priority Data

Jul. 3, 1990 [DE] Fed. Rep. of Germany ....... 4021111

[51] Int. Cl.⁵ .............................................. B65H 1/22
[52] U.S. Cl. .................................. 271/164; 271/145; 378/182; 378/188; 354/276; 354/277
[58] Field of Search ............... 378/181, 182, 188, 172, 378/173, 174; 354/276, 277; 414/411, 403; 271/145, 147, 162, 164, 241

[56] References Cited

U.S. PATENT DOCUMENTS

| 4,496,273 | 1/1985 | Thate et al. ................ | 271/164 |
| 4,525,063 | 6/1985 | Eisbein ........................ | 271/145 |
| 4,537,307 | 8/1985 | Tamura ....................... | 271/145 |
| 4,783,019 | 11/1988 | Schmidt et al. ............. | 378/182 |
| 4,809,313 | 2/1988 | Gandolfo .................... | 378/182 |
| 4,860,042 | 8/1989 | Tajima et al. ............... | 378/182 |
| 4,878,799 | 11/1989 | Seto et al. ................... | 414/411 |
| 4,895,357 | 1/1990 | Lippold ........................ | 271/145 |
| 4,933,696 | 6/1990 | Schmidt et al. ............. | 378/182 |

FOREIGN PATENT DOCUMENTS

| 0052159 | 5/1982 | European Pat. Off. . |
| 3122582 | 12/1982 | Fed. Rep. of Germany . |
| 8534241.6 | 10/1986 | Fed. Rep. of Germany . |
| 3610660 | 4/1987 | Fed. Rep. of Germany . |
| 0191334 | 8/1987 | Japan ................................ 271/147 |

Primary Examiner—H. Grant Skaggs
Attorney, Agent, or Firm—Michael J. Striker

[57] ABSTRACT

A supply magazine has a drawer-shaped, upwardly open box for introducing a sheet film stack in a light-tight envelope and for withdrawing individual sheet films after removal of the envelope, a cover part movable relative to the box, a unit for winding the envelope in a closed condition of the magazine. The cover part is formed as a flat parallelepiped which is open at its front small side and such that the box which is open at its upper side can be moved in and out of the cover part, a locking mechanism operates for locking the cover part and the box when the box is moved in. A lockable and swingable flap cover is provided on a flat side of the cover part corresponding to the upper side of the box so that when the box is moved in the cover part a sheet film stack can be inserted in the box through the flap cover.

9 Claims, 3 Drawing Sheets

SUPPLY MAGAZAINE FOR X-RAY SHEET FILM STACK IN LIGHT-TIGHT ENVELOPE

BACKGROUND OF THE INVENTION

The present invention relates to a supply magazine with a drawer-like, upwardly open box for insertion of a sheet film stack in a light-tight envelope and for withdrawal of individual sheet films after removing of the envelope.

More particularly, it relates to such a supply magazine which in addition to the above mentioned box, also has a movable cover part, and means for winding the envelope in the closed magazine, which means can be formed for example as a winding roller and arranged behind the rear side of the box which is opposite to the front side for withdrawal of the sheet film.

German documents DE-GMS 8,534,241 and DE-PS 3,122,582 disclose supply magazines which are provided with a container in form of a flat parellelepiped which has an opening provided on the flat side facing toward the upper side of the X-ray sheet film stack and extending over the supply magazine width and over a half of the supply magazine length. This opening is closeable in a light-tight manner by a cover part which is formed as a displacement pipe and displaceable along a long side of the supply magazine. The supply magazine is loadable with an X-ray sheet film stack, and the individual X-ray sheet films are withdrawn through the above mentioned opening.

It is not easy to load such a supply magazine with large X-ray sheet film formats in view of the loading and unloading opening which is limited by the half length of the supply magazine. In addition, the displacement pipe is moved back during insertion of the supply magazine in a device for loading and unloading of X-ray sheet film cassettes, so that the X-ray sheet film stack lies open in the interior of the device. This means that during maintenance works, a loss of X-ray sheet film by accidental illumination is not excluded. In addition, these as well as other commercially available magazines have the disadvantage that the number of supply magazines which can be accommodated in a device for loading and unloading of X-ray sheet film cassettes is limited due to the fact that the withdrawal opening is located inside the basic surface of the supply magazine and between the magazines a space must be available for a means for withdrawal of X-ray sheet films.

European patent document EPA 80107115.0/00521259 discloses a device for loading and unloading of X-ray sheet film cassettes in which the distance between the drawer-shaped X-ray sheet film magazines is determined only by a pin for arresting the cover part of the container. The cover of the drawer-shaped magazine extends only over the upper side of the magazine and the part of the longitudinal small side. This drawer-shaped X-ray sheet film magazines can be loaded however only in daylight, since no devices for opening and pulling out of the evnelope in the closed magazine are provided.

SUMMARY OF THE INVENTION

Accordingly, it is an object of the present invention to provide a supply magazine of the above mentioned type which is formed so that the supply magazine can be simply loaded in daylight and several supply magazines can be arranged without intermediate spaces for X-ray sheet film removing means over one another in a device for loading and unloading of X-ray sheet film cassettes.

In keeping with these objects and with others which will become apparent hereinafter, one feature of the present invention resides, briefly stated, in a supply magazine in which the cover part is formed as a flat parallelepiped which is open at its front small side and formed so that the box with its open upper side as movable in and out of the cover part, the cover part and the box are lockable by a locking mechanism in the moved-in condition of the box, the cover part is provided with a swingable flap cover on its surface which corresponds to the upper side of the box and so that with the box moved in the cover part a sheet film stack is insertable in the box through the flap cover.

When the supply magazine is designed in accordance with the present invention, a simple loading is possible by means of the flap cover, since after opening of the flap cover the means for pulling off of the X-ray sheet film envelope are easily accessible.

A latch for removing the envelope from the stack provided on the backing envelope of the X-ray sheet film can be brought in engagement with a means for pulling off of the envelope arranged in the supply magazine, without additional handles.

A further advantage of the inventive supply magazine is that despite its simple loading in daylight, the compartment or compartments for receiving the supply magazine can be arranged in the device for withdrawal of individual X-ray sheet films without an intermediate space for X-ray sheet film withdrawing means, since a box required for the corresponding format is withdrawable forwardly from the cover part and the sheet film withdrawing means can engage outside of the magazine in the interior of the device from above in the box.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
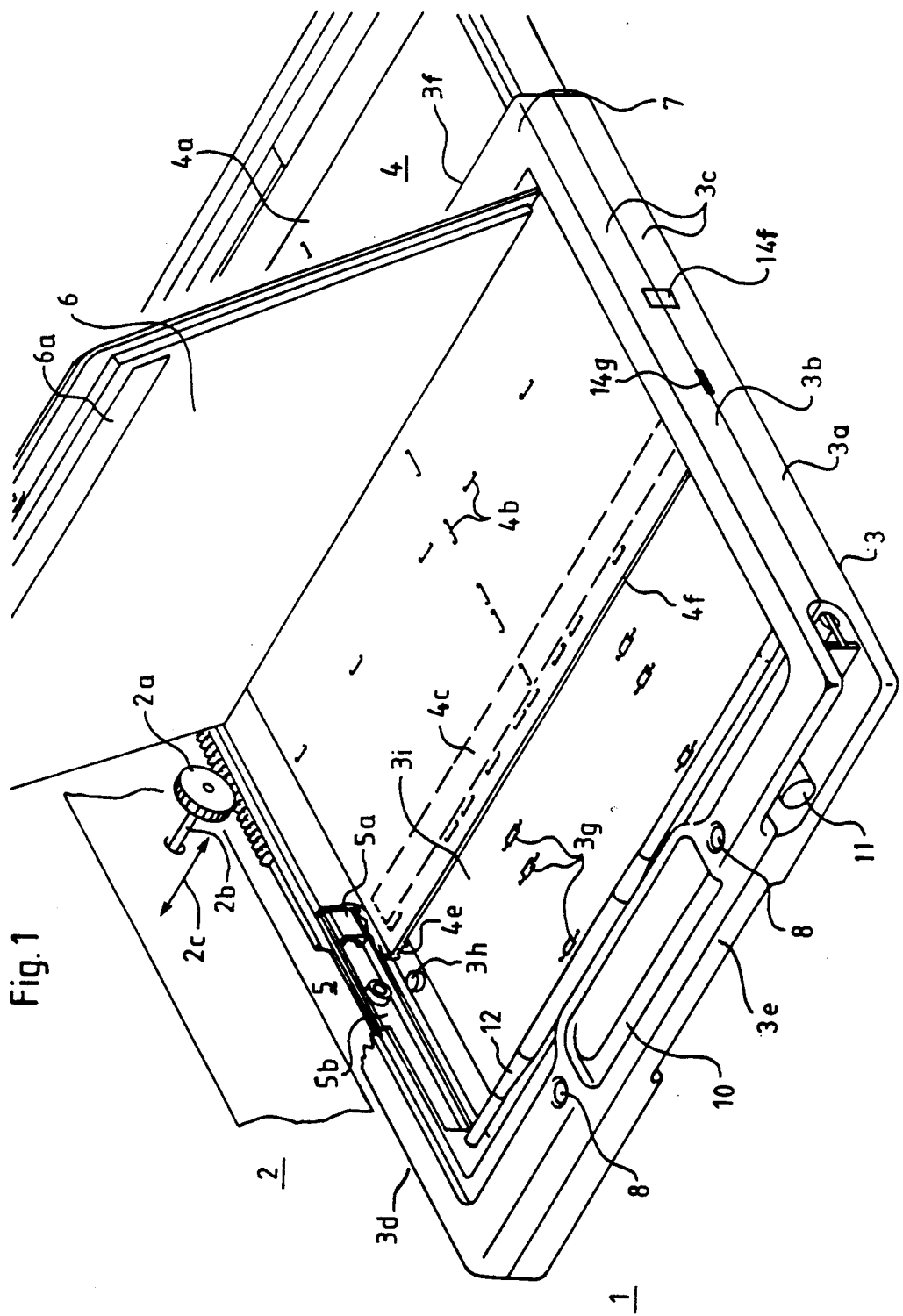
FIG. 1 is a perspective view of a supply magazine in accordance with one embodiment of the present invention, with an open flap cover.
Figure 2:
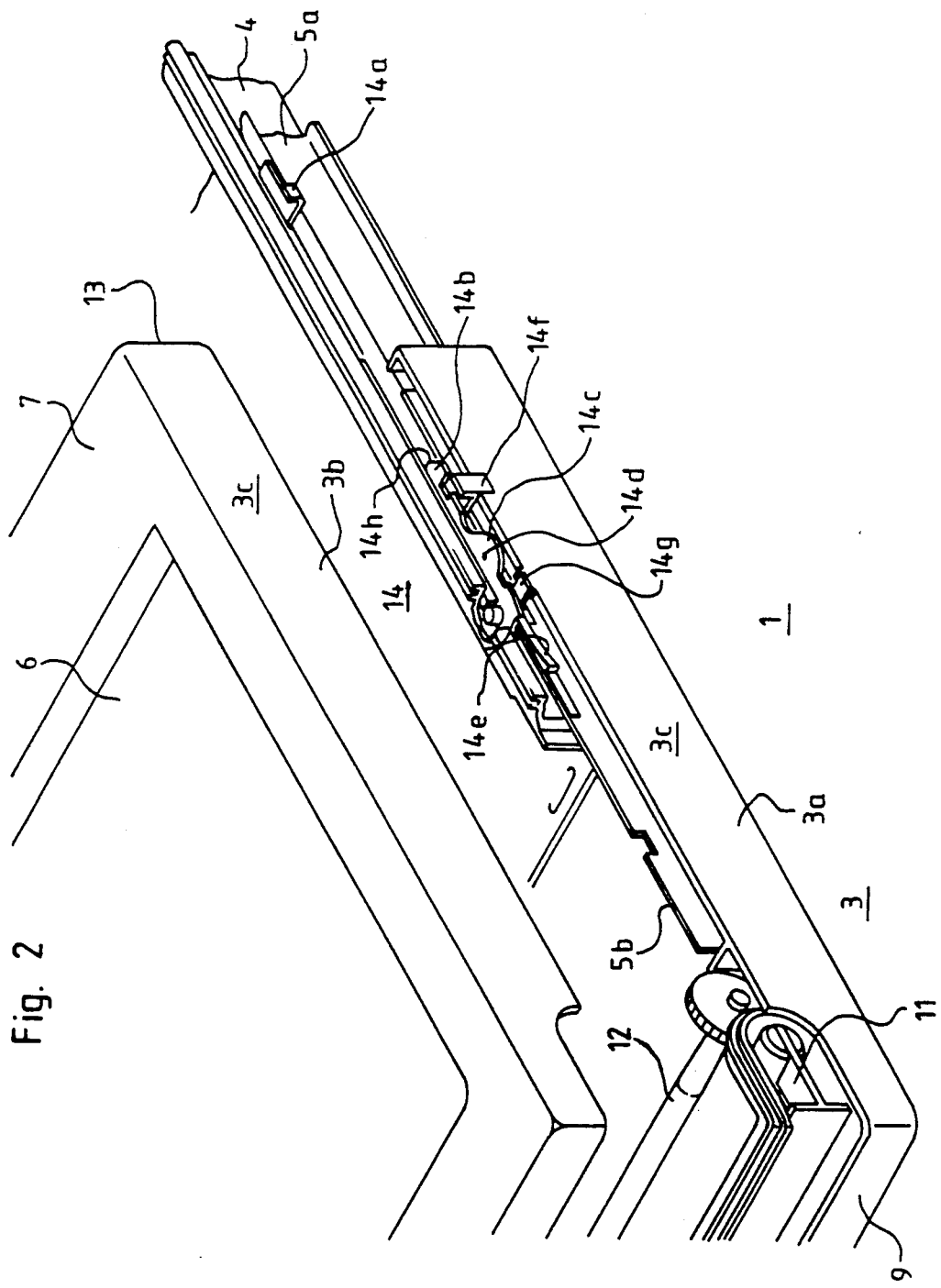
FIG. 2 is an exploded perspective view of the supply magazine of FIG. 1.
Figure 3:
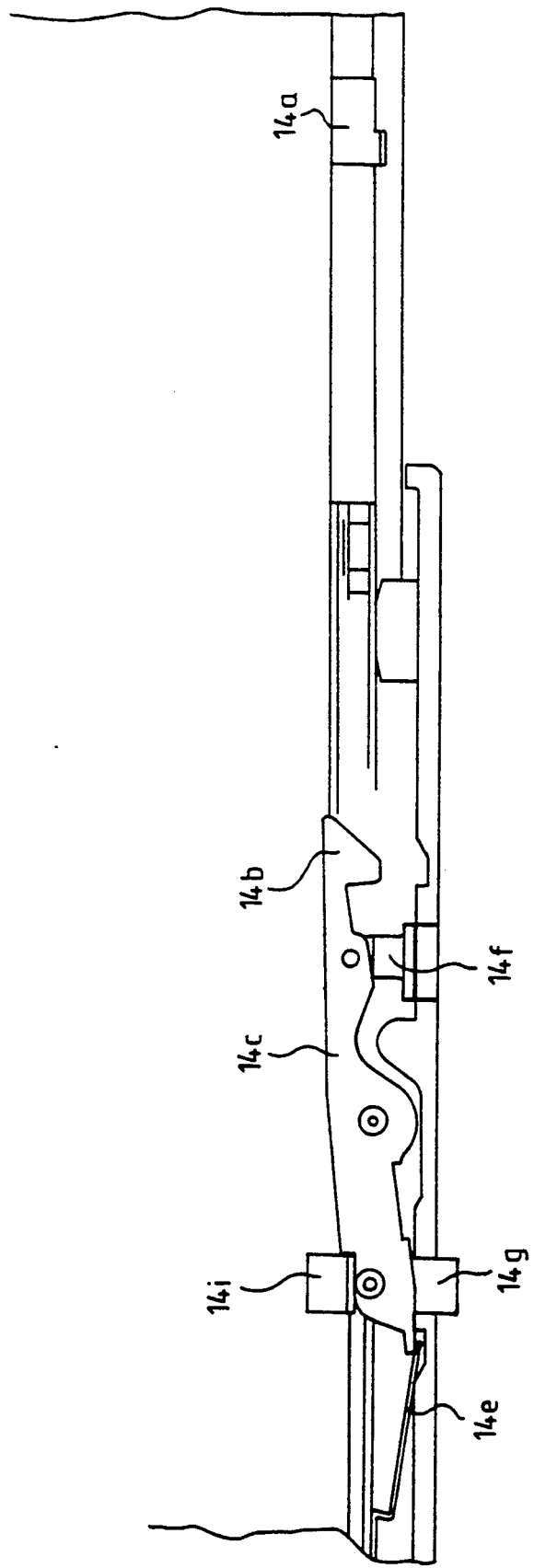
FIG. 3 is a view showing a locking mechanism of the supply magazine in accordance with the present invention.

A supply magazine in accordance with the present invention is identified in the drawings with reference numeral 1, and a conventional device for withdrawing individual X-ray sheet films is identified with reference numeral 2 and shown only schematically.

The supply magazine 1 has a cover part 3 and a box 4. The box 4 is movably supported in the cover part 3 by means of two parallel telecopable rails 5 so as to move in a longitudinal direction of the rails. The box 4 has an opening which is provided on its upper surface 4a and extends substantially over its whole surface. The supply magazine also includes a flap cover 6. The flag cover 6 has an element 6a for holding back a pack of films (as for example in U.S. Pat. No. 4,783,019). The flap cover is arranged on a flat side 7 of the supply magazine 1 which faces toward the upper side 4a of the box 4. It is lockable with the cover part 3 by a lock 8 in a light-tight manner. The cover part 3 includes a lower half shell 3a and an upper half shell 3b. A handle 10 is formed on the rear small side 3e of the cover part 3, and a swingable crank 11 is arranged in a sinking manner.

A shaft 12 which extends parallel to the rear small side 3a is drivably by the crank 11 through a known toothed gear transmission with a transmission ratio greater than 1. The telescopable rails 5 are arranged each on one of two small sides 3c and 3d which extend perpendicular to the rear small side 3e. A front small side 3f of the cover part 3, which extends opposite to the small side 3e and parallel to it, is open. The box 4 guided by telescopable rails 5 is displaceable into and out of the cover part 3 through the open front small side 3f. When the box 4 is moved in and the flap cover 6 is closed, the X-ray sheet film stack accommodated in the supply magazine 1 is closed in a light-tight manner.

The box 4 and the cover part 3 are locked with one another in the closed condition of the supply magazine by a locking mechanism 14. The locking mechanism 14 includes a projection 14a which is fixedly connected with a part 5a of the telescopable rail 5. The part 5a is mounted on the box 4. In the closed condition of the supply magazine 1, the projection 14a engages with a blocking catch 14b of a latch 14c. The latch 14c is supported rotatably on an axle 14d and held in a locking position by a spring 14e. The axle 14d is fixedly connected with an outer part 5b of the telescopable rail. The part 5b is mounted on the cover part 3.

An unlocking lever 14f is pivotably connected with the latch 14c. The free end of the unlocking lever 14f is formed flat and flush with the respective small side 3c or 3d in the cover part 3. For unlocking the box 4 of the supply magazine 1, a special means is provided in the device 2 for withdrawing individual X-ray sheet films. The means press the unlocking lever 14f against the force of the spring 14e into the interior of the supply magazine 1.

When the not shown means for unlocking the box 4 press the unlocking lever 14e into the interior of the supply magazine 1 the locking catch 14b releases the projection 14a, and a locking catch 14g which is pivotably connected with the latch 14c is moved out of the respective small side 3c or 3d.

Operation of the inventive supply magazine 1 in cooperation with the device 2 for withdrawing individual X-ray sheet films starting from an empty and closed supply magazine is as follows:

The operator actuates the lock 8 and opens the flap cover 6. He inserts an X-ray sheet film stack which is enveloped in a light-tight manner. The envelope of the X-ray sheet film stack can be similar to the envelope disclosed in the German document DE-GMS 8,534,241, and has a latch for removing the envelope. In order to insert different formats of X-ray sheet film stacks in the supply magazine 1, a slot 4b is provided in the box 4. A not shown limiting piece is insertable in the slot 4b and holds the X-ray sheet film stack in a predetermined position depending on its format. After the insertion of the X-ray sheet film stack, the operator fixes the withdrawing latch of the envelope to the shaft 12. This can be achieved in a known manner for example by adhesive bands. The insertion of the X-ray sheet film stack and the mounting of the withdrawal latch is a simple process with the inventive supply magazine 1 since no outer housing part must be moved in addition to the flap cover 6.

After the X-ray sheet film stack is inserted and the withdrawl latch of the not shown envelope is fixed to the shaft 12, the operator closes the flap cover 6 and a holding piece 4c of the box 4 for holding an X-ray sheet film stack, and also a holding piece 6a of the flap cover 6 are arranged one above the other so that an envelope withdrawal passage is formed. By tearing a safety latch in the closed supply magazine the envelope, similarly to the envelope shown in the German document DE-GMS 8,534,241, is prepared for the pulling-off of the envelope. Then the operator swings out the crank 11 from the rear small side 3e. The shaft 12 is driven by the crank 11 so that the X-ray sheet film stack envelope is wound on it and the stack is pulled off through the envelope withdrawing passage. The operator cranks until the envelope is completely withdrawn from the stack. Then the crank 11 is swung in. The thusly prepared supply magazine can now be inserted if the device 2 for withdrawal of individual X-ray sheet films.

When the supply magazine is completely inserted in a supply magazine receiving shaft of the device, the unlocking lever 14f is pressed into the supply magazine 1 by a means for unlocking the box 4. Thereby the box 4 is unlocked and the supply magazine 1 is secured from pulling out from the device 2. When the supply magazine 1 must be withdrawn, the operator must press a button on the device 2 for withdrawing of individual X-ray sheet films, and a control device supplies current to each lifting magnet. Therefore the means for unlocking of the box 4 is moved to a position in which the supply magazine 1 can be withdrawn with the closed box 4. When now an X-ray sheet film must be withdrawn, the control device controls the means for moving a drive element 2a arranged on a drive shaft 2b, as disclosed in the reference DE-PS 3,610,660. The drive shaft 2b and the German reference DE-PS 3,620,660. The drive shaft 2b and the drive element 2a can reciprocate in direction 2c. The drive 2b and the drive element 2a are moved in direction 2c to the supply magazine 1 until the drive element 2a engages with a power transmission element can be formed as a toothed rack or a friction surface in correspondence with the drive element formed as a toothed wheel or a friction wheel. Also other suitable combinations of the drive element and the power transmission element can be utilized.

When the power transmission element 4d and the drive element 2a are in engagement, the box 4 can be moved out or moved in by a drive element 2a which rotates in a corresponding direction. The control element of the device 2 for withdrawal of individual X-ray sheet films controls the device so that during the withdrawal of an individual X-ray sheet film first the box 4 is moved out. In this condition, the supply magazine 1 can be withdrawn neither by a faulty operation nor by a control. This is achieved in that, with the pressed unlocking lever 14f the latch 14c is arrested by an abutment 14 with the open box 4. When in the open condition of the box 4 a disturbance or an operator failure takes place, then the means for unlocking the box 4 release the unlocking lever 14f and thereby the supply magazine 1 for withdrawal and the latch 14c remains in its initial position and the locking catch 14g prevents the withdrawal of the supply magazine 1. The withdrawal of the supply magazine 1 is possible only when the latch 14c is back in its position for locking the supply magazine 1, that is possible only with the closed box 4. The box 4 can be opened manually outside of the device 2 when needed. For this purpose the operator pressed the unlocking lever 14c and allows the box 4 to roll out with the inclined supply magazine. For closing the supply magazine 1, the operator displaces the box 4 back into the cover part 3. The projection 14a presses back the latch 14c by the edge 14c which extends inclinedly to its movement direction, and the projection 14a is arrested by the blocking catch 14b in the closed box 4. After opening of the box 4 inside the device for withdrawing individual X-ray sheet films, the device 2 removes a sheet film with suitable means and again finally displaces the box 4 in. For providing a clamping-free moving in and moving out of the box 4, rotatably supported rollers 3g are arranged under the box 4 in the lower semi-shell 3a. Furthermore, a row of sliding pins 3h is provided, which are arranged each in a parallel line to each telescopable rail 5 fixedly in the lower semi-shell 3a. The sliding pin engage in a groove 4e. Each groove 4e extends on the lower side of the box 4 at the end of the edges of the box 4 which are parallel to the telescopable rails 5. By means of grooves 4e and the pins 3h a tilting of the box 4 during moving in and moving out is prevented.

It will be understood that each of the elements described above, or two or more together, may also find a useful application in other types of constructions differing from the types described above.

While the invention has been illustrated and described as embodied in a supply magazine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A supply magazine, comprising a drawer-shaped, upwardly open box for introducing a sheet film stack in a light-tight envelope and for withdrawing individual sheet films after removal of the envelope; a cover part movable relative to said box; and means for winding the envelope in a closed condition of the magazine, said cover part being formed as a flat parallelepiped which is open at its front small side and such that said box which is open at its upper side can be moved in and out of said cover part; a locking mechanism operative for locking said cover part and said box when said box is moved in; a lockable and swingable flap cover provided on a flat side of said cover part corresponding to the upper side of said box so that when said box is moved in said cover part a sheet film stack can be inserted in said box through said flap cover; and means for locking said flap cover so that when said flap cover is closed and locked it cooperates with the supply magazine so that the sheet film stack in the supply magazine is enclosed in a light-tight manner.

2. A supply magazine as defined in claim 1; and further comprising a device for withdrawing individual X-ray sheet films, said box and said cover part being unlockable by said locking mechanism inside said device; and a power transmitting element fixedly connected with said box and operative for moving out and moving in of said box relative to said cover part.

3. A supply magazine as defined in claim 2, wherein said power transmitting element includes a toothed rack.

4. A supply magazine as defined in claim 2, wherein said device has a drive element which is bringable in engagement with said power transmission element so that said box is movable out and in relative to said cover part.

5. A supply magazine as defined in claim 4, wherein said driving element is a toothed gear.

6. A supply magazine, comprising a drawer-shaped, upwardly open box for introducing a sheet film stack in a light-tight envelope and for withdrawing individual sheet films after removal of the envelope; a cover part movable relative to said box; and means for winding the envelope in a closed condition of the magazine, said cover part being formed as a flat parallelepiped which is open at its front small side and such that said box which is open at its upper side can be moved in and out of said cover part; a locking mechanism operative for locking said cover part and said box when said box is moved in; a lockable and swingable flap cover provided on a flat side of said cover part corresponding to the upper side of said box so that when said box is moved in said cover part a sheet film stack can be inserted in said box through said flap cover, said locking mechanism having a latch provided with a locking catch, said latch being rotatable about an axle which is fixedly connected with said cover part; a spring engaging said latch so that said latch is held in a position in which said locking catch engages with a projection provided on said box when said box is in its moved in condition; an unlocking lever pivotally connected with said latch between said locking catch and said axle and flush with small sides of said cover part; and a blocking catch arranged between said axle and an end of said latch which is subjected to the action of said spring.

7. A supply magazine as defined in claim 6; and further comprising an abutment connected with said box and located behind said latch when said unlocking lever is actuated and said box is moved out of said cover part, so that said latch is arrested in a position in which said blocking catch extends outwardly beyond a respective one of said small sides.

8. A supply magazine, comprising a drawer-shaped, upwardly open box for introducing a sheet film stack in a light-tight envelope and for withdrawing individual sheet films after removal of the envelope; a cover part movable relative to said box; and means for winding the envelope in a closed condition of the magazine, said cover part being formed as a flat parallelepiped which is open at its front small side and such that said box which is open at its upper side can be moved in and out of said cover part; a locking mechanism operative for locking said cover part and said box when said box is moved in; a lockable and swingable flap cover provided on a flat side of said cover part corresponding to the upper side of said box so that when said box is moved in said cover part a sheet film stack can be inserted in said box through said flap cover, said box having a lower side with edges extending parallel to corresponding small sides of said cover part, each of said edges being provided with a groove; and a plurality of sliding pins arranged at a flat side of a lower portion of said cover part and engaging in each of said grooves, said flat side of said lower portion having a plurality of rollers.

9. A supply magazine as defined in claim 8, wherein said lower portion of said cover part is formed as a lower shell.

* * * * *